United States Patent Office 3,575,976
Patented Apr. 20, 1971

3,575,976
3-AMINO-1,2,8,9-TETRAAZAPHENALENES
Karl J. Doebel, Ossining, and John E. Francis, Pleasantville, N.Y., assignors to Geigy Chemical Corporation, Ardsley, N.Y.
No Drawing. Continuation-in-part of application Ser. No. 718,227, Apr. 2, 1968, which is a continuation-in-part of applications Ser. No. 445,762, Apr. 5, 1965, Ser. No. 539,303, Apr. 1, 1966, and Ser. No. 583,980, Oct. 3, 1966, said Ser. No. 539,303 being a continuation-in-part of application Ser. No. 445,762, and Ser. No. 583,980 being a continuation-in-part of applications Ser. No. 539,303, and Ser. No. 445,767. This application Mar. 24, 1969, Ser. No. 810,007
Int. Cl. C07d 51/02
U.S. Cl. 260—250
10 Claims

ABSTRACT OF THE DISCLOSURE 3-amino - 1,2,8,9 - tetraazaphenalenes optionally substituted in the 4, 5, 6, 7 and/or 9 positions and their salts are cardiovascular agents and can be prepared from the corresponding 1,2,8,9-tetraazaphenalenes. Representative embodiments are 3-amino-1,2,8,9-tetraazaphenalene and 3-benzylamino-9-phenyl-1,2,8,9-tetraazaphenalene.

CROSS REFERENCE

This is a continuation-in-part of copending application Ser. No. 718,227 filed Apr. 2, 1968 which in turn is a continuation-in-part of Ser. Nos. 583,980, 539,303 and 445,762 filed Oct. 3, 1966, Apr. 1, 1966 and Apr. 5, 1965 respectively, all now abandoned, Ser. No. 539,-303 being a continuation-in-part of Ser. No. 445,762 and Ser. No. 583,980 being a continuation-in-part of Ser. Nos. 539,303 and 445,767.

The present invention pertains to 3-amino-1,2,8,9-tetraazaphenalenes of the formula:

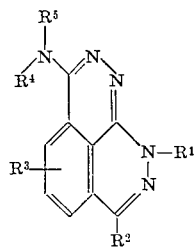

I wherein $R^1$ is hydrogen, (lower)alkyl, phenyl or phenyl(lower)alkyl;
$R^2$ is hydrogen or phenyl;
$R^3$ is hydrogen, chloro, bromo, hydroxy, (lower)alkoxy, carboxy or nitro;
$R^4$ is hydrogen or (lower)alkyl; and
$R^5$ is hydrogen, (lower)alkyl, phenyl, chlorophenyl or benzyl and to the acid addition salts thereof.

The term "alkyl" and derivatives thereof such as "alkoxy" denotes a straight or branched hydrocarbon chain. When qualified by the designation ("lower"), such chain will contain up to and including 6 carbon atoms. Illustrative of such alkyl groups are methyl, ethyl, propyl, isopropyl, butyl, sec-butyl, t-butyl, pentyl, hexyl, and the like, while illustrative of such alkoxy groups are methoxy, ethoxy, propoxy, butoxy and the like.

The compounds of the present invention are identified herein as derivatives of the novel parent tricyclic nucleus 1,2,8,9-tetraazaphenalene which is assigned the following numbering

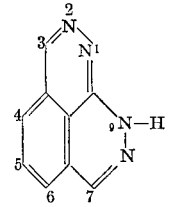

The tetraazaphenalenes of the present invention are characterized in part by the presence of an amino function in the 3-position. This may be a simple amino group or an amino group substituted by (lower)alkyl phenyl, chlorophenyl or benzyl.

The 3-amino-1,2,8,9-tetraazaphenalenes of the instant invention are cardiovascular agents, in particular, blood pressure lowering agents and are used in counteracting hypertension. They also manifest coronary and peripheral vascular dilation properties, effects on the central nervous system and anti-inflammatory activity.

These compounds can be administered parenterally or orally in any of the usual pharmaceutical forms including tablets, capsules, powders, suspensions, solutions, syrups and the like, including sustained release preparations which can be compounded by any of the known procedures.

The 3-amino-1,2,8,9-tetraazephenalenes of the present invention when one of $R^4$ and $R^5$ is other than hydrogen are prepared through treatment of a 3-chloro- or 3-bromo-1,2,8,9-tetraazaphenalene of Formula II with the appropriate amine.

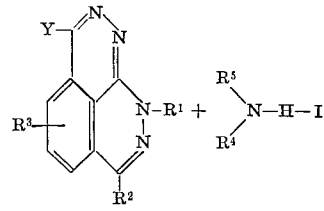

II

In the above Y is chloro or bromo and $R^1$, $R^2$, $R^3$, $R^4$ and $R^5$ are as previously defined, one of $R^4$ and $R^5$ being other than hydrogen.

The reaction is executed by simply heating a mixture of the reactants optionally in an inert organic solvent such as methylcellosolve, diglyme, triglyme or the like. Generally excess amine is employed, and in the case of lower boiling amines, increased pressure may be utilized.

The valuable 3 - chloro and 3 - bromo - 1,2,8,9-tetraazaphenalenes of Formula II can be prepared by several routes. In one method a 3-keto-2,3-dihydro-1,2,8,9-tetraazaphenalene is treated with an excess phosphorus oxychloride or phosphorus pentachloride and phosphorus oxychloride or phosphorus oxybromide or phosphorus pentabromide and phosphorus oxybromide at elevated temperatures, e.g., at reflux, until a chloro or bromo group is introduced in the 3-position. This transformation may be represented as follows:

III → II

Alternatively, the 3-chloro and 3-bromo-1,2,8,9-tetraazaphenalene compounds of Formula II can be prepared from the corresponding 3-unsubstituted 1,2,8,9 - tetraazaphenalenes through the action of chlorine or bromine in the presence of sodium acetate.

The above mentioned 3-keto-2,3-dihydro-1,2,8,9-tetraazaphenalenes and 3 - unsubstituted - 1,2,8,9 - tetraazaphenalenes are the subject of copending applications filed herewith. Briefly one preparation of such compounds involves the following:

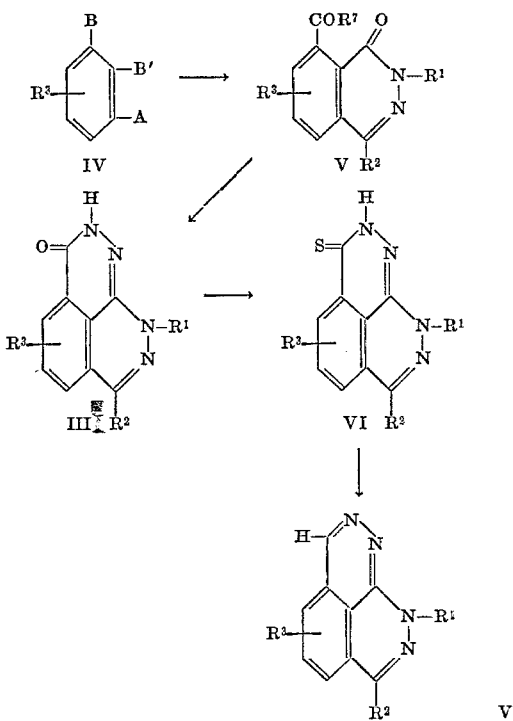

With greater particularity to the above reaction scheme, the starting material is a compound of Formula IV wherein $R^3$ is as previously defined, A is dibromomethyl, an aldehyde group, or benzoyl and each of B and B' is a carboxyl group or a group the oxidative state of which corresponds to that of a carboxyl group, including acid halides, anhydrides, esters and lactones thereof. Representative compounds of Formula IV thus include 3-dibromomethyl-phthalic anhydride, 3-hydroxy-7-carboxyphthalide, 2-dibromomethyl-6-carbethoxybenzoic acid. A compound of Formula IV is then treated with a single molar equivalent of a hydrazine to yield the substituted 1(2H) phthalazinone of Formula V wherein $R^7$ is hydroxy. This, or the corresponding derivative wherein $R^7$ is alkoxy, chloro or bromo, when treated with hydrazine, yields the 3-keto-2,3-dihydro-1,2,8,9-tetraazaphenalene of Formula III which is converted directly to the 3-chloro- or 3-bromo-1,2,8,9-tetraazaphenalene of Formula II as previously described. Alternatively the keto compound of Formula III is treated with phosphorus pentasulfide in, for example, refluxing pyridine to yield the corresponding 3-thiono-2,3-dihydro-1,2,8,9-tetraazaphenalene of Formula VI. This thiono compound is then treated with Raney nickel in an inert organic solvent such as methyl cellosolve to yield the corresponding 3-substituted 1,2,8,9-tetraazaphenalenes of Formula VII.

Those compounds of the present invention wherein $R^4$ and $R^5$ are hydrogen are obtained by cyclization of an 8-cyano-1(2H)phthalazinone with hydrazine in a fashion analogous to that for the compounds of Formula V. The 8-cyano compounds are readily obtained from the compounds of Formula V where $R^7$ is chloro through conversion to the corresponding amides with liquid ammonia and dehydration with phosphoryl chloride. These reactions may be represented as follows:

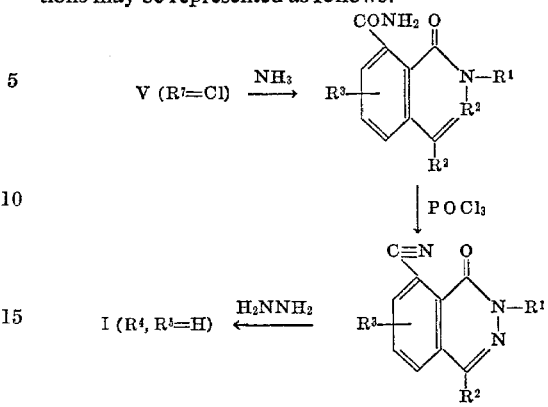

Included within the scope of the present invention are the acid addition salts of these novel tetraazaphenalene derivatives, obtained via the conventional methods. Typical salts thus include those derived from hydrochloric, hydrobromic, sulfuric phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

3-chloro-9-phenyl-1,2,8,9-tetraazaphenalene (a) 3-dibromomethylphthalic anhydride.—A mixture of 3-methylphthalic anhydride (81 g.), N-bromosuccinimide (182 g.), benzoyl peroxide (40 mg.) and carbon tetrachloride (1500 ml.) is irradiated and heated to reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. Two recrystallizations from ether-hexane yield colorless needles melting at 93–95° C.

Calcd. for $C_9H_4Br_2O_3$ (percent): C, 33.78; H, 1.26; Br, 49.92. Found (percent): C, 33,66; H, 1.20; Br, 49.41.

(b) 3-hydroxy-7-carboxyphthalide.—3-dibromomethylphthalic anhydride (40 g.) is added in small portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.), treated with decolorizing charcoal and filtered.

After three days at 5° C., the colorless filtrate yields 21.3 g. (88%) of colorless blocks, M.P. 163.5–166° C. The analytical sample, M.P. 165.5–168.5° C., is obtained after two further crystallizations from water.

Calcd. for $C_9H_6O_5$ (percent): C, 55.68; H, 3.12. Found (percent): C, 55.98; H, 2.99.

(c) 8-carboxy-2-phenyl-1(2H)-phthalazinone.—A mixture of phenylhydrazine (3.6 ml.), 3-hydroxy-7-carboxyphthalide (582 g.) and glacial acetic acid (100 ml.) is heated under reflux for 18 hours. The clear solution is evaporated to dryness in vacuo and the residual solid triturated with methanol and collected. The product (6.97 g.), M.P. 197–199°, is recrystallized from benzene and a colorless crystalline product, M.P. 197–198° obtained.

Calcd. for $C_{15}H_{10}N_2O_3$ (percent): C, 67.66; H, 3.79; N, 10.52. Found (percent): C, 67.28; H, 3.75; N, 10.82.

The infrared spectrum (Nujol) shows prominent peaks at 1720 cm.$^{-1}$ (carboxyl group) and 1650 cm.$^{-1}$ (amide carbonyl).

(d) 8-carbethoxy-2-phenyl-1(2H)phthalazinone.—To a solution of thionyl chloride (40 ml.) in chlorobenzene (150 ml.) is added under stirring 8-carboxy-2-phenyl-1(2H)phthalazinone (24.3 g.) and the mixture heated at reflux with exclusion of moisture for 2 hours. When the evolution of gas has ceased, the solution is evaporated to dryness in vacuo. The residual white solid (24.7 g.) is treated with absolute ethanol (350 ml.) and heated under reflux for 18 hours. The solution is filtered hot and allowed to cool slowly. The ester precipitates in colorless needles, M.P. 150–151°. The melting point is unchanged after recrystallization from ethanol.

Calcd. for $C_{17}H_{14}N_2O_3$ (percent): C, 69.37; H, 4.79; N, 9.52. Found (percent): C, 69.08; H, 4.65; N, 9.36.

(e) 3-keto-9-phenyl-2,3-dihydro-1,2,8,9-tetraazaphenalene.—A mixture of 2-phenyl-8-carbethoxy-1(2H)phthalazinone (11.76 g.), 100% hydrazine hydrate (40 ml.) and methyl cellosolve (160 ml.) is heated at reflux for 25 hours. The yellow solution is filtered and treated with methanol (100 ml.) followed by water dropwise under stirring. A flocculent yellow precipitate forms. The mixture is cooled and the product collected, washed thoroughly with water and ethanol and dried in vacuo. The solid (4.44 g.) M.P. 254–6°, is recrystallized from methyl cellosolve and obtained as yellow needles, M.P. 255–7°.

Calcd. for $C_{15}H_{10}N_4O$ (percent): C, 68.70; H, 3.85; N, 21.37. Found (percent): C, 68.81; H, 3.90; N, 21.20.

(f) 3-chloro-9-phenyl-1,2,8,9-tetraazaphenalene.—To a stirred mixture of phosphorus pentachloride (6.3 g.) in phosphorus oxychloride (40 ml.) is added finely powdered 3-keto-9-phenyl-2,3-dihydro-1,2,8,9-tetraazaphenalene (7.8 g.). The mixture is stirred at reflux for 165 minutes under moisture exclusion and then poured cautiously into ice. The mixture is made alkaline under cooling with 20% sodium hydroxide solution and the fine yellow precipitates which forms is collected and washed with water. As this material still contains inorganic solid, it is stirred for ½ hour in 600 ml. of warm (50°) water and again filtered. The precipitate is recrystallized from ethanol and 5.4 g. of yellow crystals, M.P. 225–228°, obtained.

EXAMPLE 2

3-chloro-9-methyl-1,2,8,9-tetraazaphenalene (a) 3-keto-2,3-dihydro-1,2,8,9-tetraazaphenalene. — A suspension of $\alpha,\alpha$-dibromo-3-methylphthalic anhydride (80 g.) in ethanol (500 cc.) is treated with a solution of 100% hydrazine hydrate (100 cc.) and water (100 cc.) dropwise under stirring and cooling. A white suspension forms After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo, dissolved in 500 ml. of glacial acetic acid and heated under reflux for 18 hours. The mixture is cooled and filtered and a second crop of the product obtained. The overall yield of product, M.P. >347°, is 25.7 g., or 55% of theory. The product is recrystallized from 3 liters of boiling dimethylformamide and obtained as a yellow powder which, on heating, forms a microcrystalline solid at 220–270° C. and melts above 350° C.

Calcd. (percent): C, 58.06; H, 3.25; N, 30.09. Found (percent): C, 57.92; H, 3.58; N, 30.28; C, 58.03; H, 3.52.

(b) 3 - keto - 9 - methyl - 2,3-dihydro-1,2,8,9-tetraazaphenalene.—To a stirred suspension of sodium methoxide (0.7 g.) in dry dimethylsulfoxide (100 ml.) is added 3 - keto-2,3-dihydro-1,2,8,9-tetraazaphenalene (1.86 g.). This is stirred at 60° under moisture exclusion until a red solution has formed. This is cooled to 50° C. and methyliodide (1 ml.) is added. The solution darkens, and after 20 minutes, more methyliodide (1 ml.) is added and the solution is poured into ice water (500 ml.) containing 0.5 g. of sodium bisulfite and 4 ml. of glacial acetic acid. The mixture is cooled overnight and then filtered. The product is collected by filtration, washed with water and dried. The yellow solid (1.2 g.) is twice recrystallized from methyl cellosolve and clarified with charcoal, to yield the product, M.P. 289–293°.

(c) 3 - chloro - 9 - methyl-1,2,8,9-tetraazaphenalene.— To a stirred mixture of phosphorus pentachloride (11.25 g.) in phosphorus oxychloride (90 ml.) is added 3-keto-9-methyl-2,3-dihydro-1,2,8,9-tetraazaphenalene. This mixture is stirred at reflux under moisture exclusion for 2 hours and then poured into ice and rendered basic under stirring and cooling with 20% sodium hydroxide solution. The yellow solid is collected, washed thoroughly with water and dried in a dessicator over phosphorus pentoxide. The product (8.63 g.) is recrystallized twice from ethanol with clarification over charcoal to yield 4.75 g. of product, M.P. 253–255° (dec.).

In a similar fashion to that described in part (c) of this example, 3-keto-2,3-dihydro-1,2,8,9-tetraazaphenlene is converted to 3-chloro-1,2,8,9-tetraazaphenalene which as the methanesulfonate salt melts at 246–249° (dec.).

EXAMPLE 3

3-chloro-7-phenyl-1,2,8,9-tetraazaphenalene (a) 8 - carboxy - 4 - phenyl - 1(2H)phthalazinone.— A mixture of 32.5 g. of 3-benzoylphthalic acid and 85 ml. of hydrazine hydrate in 145 ml. of water is heated at reflux for 18 hours. Upon cooling and acidification with hydrochloric acid, the product forms as a solid. This is collected and recrystallized from glacial acetic acid, M.P. 257–259°.

(b) 8 - carbomethoxy - 4 - phenyl - 1(2H)phthalazinone.—The product of part (a) (19.0 g.), 32 ml. of thionyl chloride and 115 ml. of chlorobenzene is heated at reflux with exclusion of moisture for 3 hours. The solid obtained upon concentration under reduced pressure is taken up in 300 ml. of methanol and this solution is then heated at reflux for 18 hours. Upon cooling the product, M.P. 198–202°, is collected and can be used directly in the next step.

(c) 3 - keto - 7 - phenyl - 2,3 - dihydro - 1,2,8,9-tetraazaphenalene.—A mixture of 18.6 g. of 8-carbomethoxy-4-phenyl-1(2H)phthalazinone, 400 ml. of hydrazine hydrate and 100 ml. of water is heated at reflux for 20 hours. The solid which forms upon cooling is collected, washed with water and recrystallized from methyl cellosolve, M.P. over 350° C.

(d) 3 - chloro - 7 - phenyl-1,2,8,9-tetraazaphenalene.— A mixture of 3 - keto - 7 - phenyl - 2,3-dihydro-1,2,8,9-tetraazaphenalene (5 g.), phosphoryl chloride (27 ml.) and phosphorus pentachloride (4 g.) is heated at reflux under moisture exclusion. The mixture is then concentrated under reduced pressure, taken up in acetone and quenched in ice-water. The solid product is collected, washed with cold water and dried, M.P. 278–288° C.

EXAMPLE 4

3-chloro-9-benzyl-1,2,8,9-tetraazaphenalene

A mixture of 3 - keto-9-benzyl-2,3-dihydro-1,2,8,9-tetraazaphenalene (47 g.), phosphorus oxychloride (340 ml.) and phosphorus pentachloride (43 g.) is heated at reflux with exclusion of moisture for 1½ hours. The reaction mixture is then evaporated to dryness at reduced pressure and the residue taken up in acetone. This acetone solution is poured into ice water with stirring and the resultant mixture is rendered basic with 20% sodium hydroxide solution and extracted with chloroform. The chloroform extracts are washed with water, dried over sodium sulfate and concentrated to dryness at reduced pressure to yield the product which is purified through recrystallization from a mixture of methyl cellosolve and ethanol, M.P. 203.5–207.5°.

Further purification may be effected through passage of a chloroform solution of the product over neutral alumina followed by recrystallization from benzene, M.P. 208–209°.

EXAMPLE 5

3-bromo-9-methyl-1,2,8,9-tetraazaphenalene (a) 9 - methyl - 1,2,8,9 - tetraazaphenalene.—3 - keto-9 - methyl - 2,3-dihydro-1,2,8,9-tetraazaphenalene (9.0 g.) in 120 ml. of dry pyridine and 12 g. phosphorus pentasulfide are mixed with stirring and refluxed for 2.5 hours. The mixture is poured into an ice-salt mixture, stirred for 30 minutes and filtered. The solid thus collected is dried and recrystallized from methyl cellosolve to yield 3 - thiono - 9 - methyl - 2,3-dihydro-1,2,8,9-tetraazaphenalene, M.P. 299–316° C.

3 - thiono - 9 - methyl - 2,3 - dihydro - 1,2,8,9 - tetraazaphenalene (1.08 g.) is suspended in ethanol (200 ml.) and treated with Raney nickel (about 5 g.) in ethanol added in several portions. After the addition is complete, the mixture is stirred for one hour on the steam bath and then filtered hot. The filtrate is evaporated in vacuo, taken up in ethanol and again filtered. Evaporation of the ethanol solution yields a yellow solid (0.60 g.). The product is purified by one recrystallization from benzene hexane. Yellow crystals (0.40 g.) are obtained melting in the range 145–147°.

Calcd. for $C_{10}H_8N_4$ (percent): C, 65.20; H, 4.38; N, 30.42. Found (percent): C, 65.03; H, 4.59; N, 30.15.

(b) 3 - bromo - 9 - methyl-1,2,8,9-tetraazaphenalene.— To a solution of 9-methyl-1,2,8,9-tetraazaphenalene (368 mg.) and 165 mg. of anhydrous sodium acetate in 25 ml. of glacial acetic acid are added in a dropwise fashion with stirring 320 mg. of bromine in 25 ml. of glacial acetic acid. The mixture is stirred for 18 hours and then poured into water, filtered and concentrated to dryness. The solid is triturated with warm water, filtered and recrystallized from ethanol to yield the product, M.P. 237–238°.

Calcd. for $C_{10}H_7N_4Br$ (percent): C, 45.65; H, 2.68; N, 21.29. Found (percent): C, 45.30; H, 2.57; N, 21.54.

EXAMPLE 6

3-anilino-9-phenyl-1,2,8,9-tetraazaphenalene

A mixture of 3-chloro-9-phenyl-1,2,8,9-tetraazaphenalene (6 g.) and redistilled aniline (70 ml.) is stirred under nitrogen at 150° (bath temperature) for 16 hours. The aniline is removed by distillation at reduced pressure (14 mm./Hg) and the residue taken up in chloroform and washed several times with water. The chloroform layer is dried over sodium sulfate and concentrated to dryness in vacuo. The brownish residue is triturated with ether and filtered. The yellow solid (M.P. 260–266°) is collected and recrystallized three times from chloroform-ether to yield 3.4 g. of yellow crystals, M.P. 266–267°.

EXAMPLE 7

3-benzylamino-9-phenyl-1,2,8,9-tetraazaphenalene

A mixture of 3-chloro-9-phenyl-1,2,8,9-tetraazaphenalene (6.0 g.) and benzylamine (120 ml.) is stirred at reflux for 66 hours. The resulting solution is concentrated under reduced pressure to incipient dryness and the residue triturated with ether and filtered. The precipitate is recrystallized from benzene-hexane and the product obtained as orange crystals, M.P. 169–173° C.

EXAMPLE 8

3-(o-chloroanilino)-9-phenyl-1,2,8,9-tetraazaphenalene

A mixture of 3-chloro-9-phenyl-1,2,8,9-tetraazaphenalene (4.2 g.) and o-chloroaniline (23 ml.) is stirred at 150° for 20 hours, cooled and poured into cold ether. The precipitate is collected, washed with ether and taken up in chloroform. The chloroform layer is washed with water, dried over sodium sulfate and evaporated to dryness at reduced pressure. The residue is recrystallized from ethanol to afford the product, M.P. 213–215°.

Calcd. for $C_{21}H_{14}ClN_5$ (percent): C, 67.82; H, 3.79; N, 18.84; Cl, 9.54. Found (percent): C, 67.51; H, 4.03; N, 18.77; Cl, 9.51.

EXAMPLE 9

3-diethylamino-9-methyl-1,2,8,9-tetraazaphenalene

A mixture of 3-chloro-9-methyl-1,2,8,9-tetraazaphenalene (2.15 g.), diethylamine (15 ml.) and methyl cellosolve (20 ml.) in a pressure vessel is evacuated at −70°, the vessel is sealed and the mixture is heated at 190° for 18 hours at 40 lbs./in.². The solution is then concentrated to dryness at reduced pressure and the residue triturated with 1 N hydrochloric acid (150 ml.). The mixture is filtered and the filtrate is rendered alkaline with 5% sodium carbonate solution and extracted with chloroform. The chloroform extract is dried, clarified with charcoal and concentrated to dryness. The residue is triturated with ether and filtered. The filtrate is concentrated to dryness, dissolved in ethyl acetate and chromatographed on aluminum oxide, eluting with ethyl acetate to yield the product, M.P. 122–5°.

EXAMPLE 10

3-dimethylamino-9-methyl-1,2,8,9-tetraazaphenalene

In a heavy glass pressure tube equipped with valve connected to a pressure gauge was placed a magnetic stirring bar, 3-chloro-9-methyl-1,2,8,9-tetraazaphenalene (4-4 g.), methyl cellosolve (25 ml.) and dimethylamine (40 ml.). The mixture is stirred at 165–170 p.s.i. at an external temperature of 160° for two days whereupon a dark solution forms. The solution is then evaporated to dryness under reduced pressure and the residue taken up in 1 N hydrochloric acid, stirred for 30 minutes and filtered. The filtrate is rendered basic under cooling with 5% sodium carbonate solution and extracted with chloroform. The chloroform layer is dried over sodium sulfate and evaporated to dryness at reduced pressure. The residue is dissolved in a minimal volume of ethyl acetate, passed through a column of Woelm basic alumina, grade I, and the first non-fluorescent fraction collected. Evaporation of the solvent yields the product which is recrystallized twice from hexane, M.P. 151–153°.

EXAMPLE 11

3-amino-9-methyl-1,2,8,9-tetraazaphenalene (a) 2 - methyl-8-cyano-1(2H)phthalazinone.—A mixture of 2-methyl-8-carbamyl-1(2H)phthalazinone (30 g.) and phosphorous oxychloride (310 ml.) is stirred under reflux for 20 hours, cooled and concentrated at reduced pressure to remove residual solvent. The solid residue is triturated with ice-water-sodium carbonate mixture and then collected, washed with water and dried in a dessicator over phosphorus pentoxide. The product after two recrystallizations from benzene-hexane, melts at 254–254.5°.

(b) 3-amino-9-methyl-1,2,8,9-tetraazaphenalene methanesulfonate.—A mixture of 2 - methyl-8-cyano-1(2H)-phthalazinone (12 g.) and hydrazine hydrate (276 ml.) is stirred at reflux for 3½ hours. The reaction mixture is cooled in an ice bath and the precipitate collected and dried. The mother liquor is cooled for 20 hours to yield a second crop. The combined material is recrystallized from methanol (350 ml.) to afford the product. This is suspended in a small amount of methanol and treated with methanesulfonic acid (1.8 ml.). The solution is then treated with dry ether and the salt collected and recrystallized twice from ethanol, M.P. 280–286° (dec.).

In a similar fashion from 8-carbamyl-1(2H)-phthalazinone there is obtained 3-amino-1,2,8,9-tetraazaphenalene which as the methanesulfonate demonstrates a melting point of 259–263° C.

The requisite 8-carbamyl starting materials are obtained from the acid chlorides of 8-carboxy-1(2H)phthalazinones through treatment with liquid ammonia.

What is claimed is:

1. A compound of the formula:

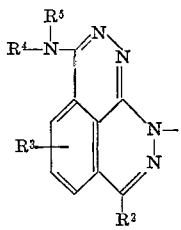

wherein $R^1$ is hydrogen, (lower)alkyl, phenyl or phenyl(lower)alkyl;

$R^2$ is hydrogen or phenyl;

$R^3$ is hydrogen, chloro, bromo, hydroxy, (lower)alkoxy, carboxy or nitro;

$R^4$ is hydrogen or (lower)alkyl; and $R^5$ is hydrogen, (lower)alkyl, phenyl, chlorophenyl or benzyl.

2. The acid addition salts of a compound according to claim 1.

3. A compound according to claim 1 wherein $R^3$ is hydrogen and each of $R^4$ and $R^5$ taken separately is hydrogen or (lower)alkyl.

4. The compound according to claim 1 wherein said compound is 3-anilino-9-phenyl-1,2,8,9-tetraazaphenalene.

5. The compound according to claim 1 wherein said compound is 3-benzylamino-9-phenyl-1,2,8,9-tetraazaphenalene.

6. The compound according to claim 1 wherein said compound is 3-(2-chloroanilino)-9-phenyl-1,2,8,9-tetraazaphenalene.

7. The compound according to claim 1 wherein said compound is 3-diethylamino-9-methyl-1,2,8,9-tetraazaphenalene.

8. The compound according to claim 1 wherein said compound is 3-amino-9-methyl-1,2,8,9-tetraazaphenalene.

9. The compound according to claim 1 wherein said compound is 3-amino-1,2,8,9-tetraazaphenalene.

10. The compound according to claim 1 wherein said compound is 3-dimethylamino-9-methyl-1,2,8,9-tetraazaphenalene.

References Cited

UNITED STATES PATENTS 3,422,105   1/1969   Doebel et al. _____ 260—250A
3,429,882   2/1969   Doebel et al. _____ 260—250A NICHOLAS S. RIZZO, Primary Examiner U.S. Cl. X.R.

424—250

UNITED STATES PATENT OFFICE
CERTIFICATE OF CORRECTION

Patent No. 3,575,976                    Dated April 20, 1971

Inventor(s) Karl J. Doebel and John E. Francis

It is certified that error appears in the above-identified patent and that said Letters Patent are hereby corrected as shown below:

Column 1 line 65 - "("lower")" should read -- "(lower)" --.

Column 2 line 5 -                              should read

"  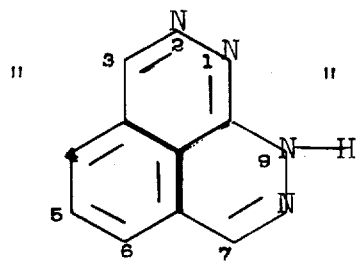   "         --  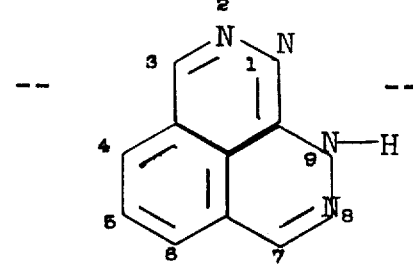  --

Column 4 line 5 -                              should read

"  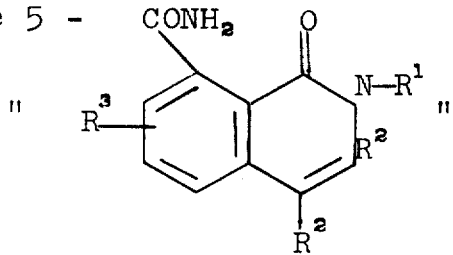   "         --  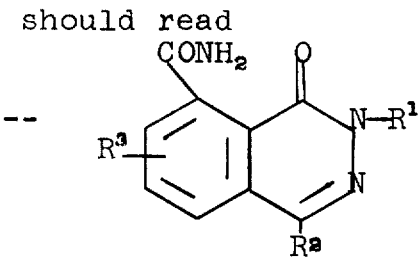  --

Column 4 line 69 - "(582 g.)" should read -- (5.82 g.) --.

Column 8 line 32 - "(4-4 g.)" should read -- (4.4 g.) --.

FORM PO-1050 (10-69)

UNITED STATES PATENT OFFICE
CERTIFICATE OF CORRECTION

Patent No. 3,575,976         Dated April 20, 1971

Inventor(s) Karl J. Doebel and John E. Francis    PAGE - 2

It is certified that error appears in the above-identified patent and that said Letters Patent are hereby corrected as shown below:

Column 9 Claim 1 formula -

"  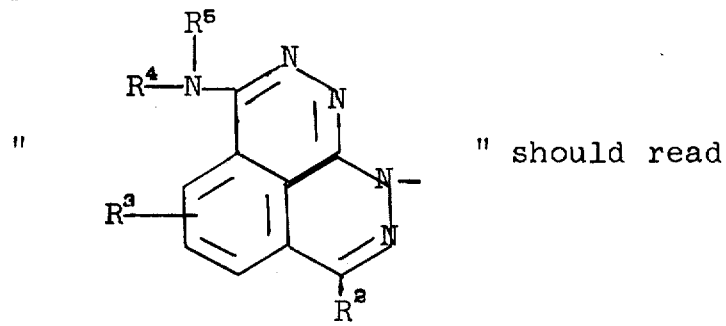  " should read

-- 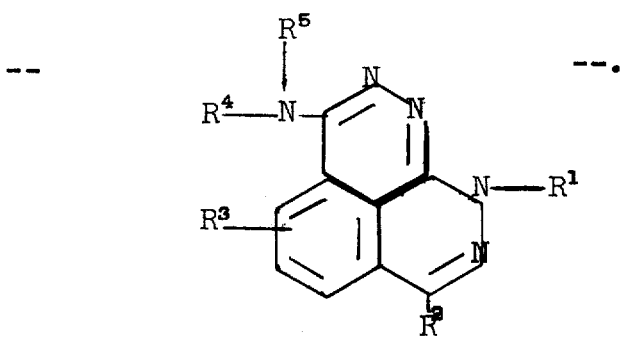 --.

Signed and sealed this 28th day of March 1972.

(SEAL)
Attest:

EDWARD M. FLETCHER, JR.         ROBERT GOTTSCHALK
Attesting Officer                Commissioner of Patents